United States Patent
Sprout et al.

(10) Patent No.: US 9,951,902 B2
(45) Date of Patent: Apr. 24, 2018

(54) APPARATUS AND METHOD FOR A PIPE HANDLING SYSTEM

(71) Applicant: Terra Sonic International, LLC, Marietta, OH (US)

(72) Inventors: Edwin L. Sprout, Walker, WV (US); James R. Savinkoff, Reno, OH (US)

(73) Assignee: Terra Sonic International, LLC, Marietta, OH (US)

( * ) Notice: Subject to any disclaimer, the term of this patent is extended or adjusted under 35 U.S.C. 154(b) by 47 days.

(21) Appl. No.: 14/936,221

(22) Filed: Nov. 9, 2015

(65) Prior Publication Data
US 2016/0130892 A1    May 12, 2016

Related U.S. Application Data

(60) Provisional application No. 62/076,883, filed on Nov. 7, 2014.

(51) Int. Cl.
*E21B 19/15*    (2006.01)
*F16M 11/04*    (2006.01)
*F16M 11/38*    (2006.01)

(52) U.S. Cl.
CPC ........... *F16M 11/046* (2013.01); *E21B 19/15* (2013.01); *F16M 11/041* (2013.01); *F16M 11/38* (2013.01)

(58) Field of Classification Search
CPC ..... E21B 19/15; E21B 19/155; F16M 11/041; F16M 11/046; F16M 11/38
See application file for complete search history.

(56) References Cited

U.S. PATENT DOCUMENTS

| | | | | |
|---|---|---|---|---|
| 2,790,683 A | * | 4/1957 | Clark | E21B 19/155 108/145 |
| 3,254,776 A | * | 6/1966 | Brown | B65G 1/08 193/17 |
| 4,386,883 A | * | 6/1983 | Hogan | E21B 19/155 414/22.61 |
| 6,079,925 A | * | 6/2000 | Morgan | E21B 19/14 414/22.57 |

(Continued)

FOREIGN PATENT DOCUMENTS

| | | |
|---|---|---|
| CN | 103452505 A | 12/2013 |
| CN | 203655187 U | 6/2014 |

OTHER PUBLICATIONS

PCT International Search Report and Written Opinion from International Application No. PCT/US2015/059737, dated Mar. 8, 2016, 17 pages.

*Primary Examiner* — Matthew R Buck
(74) *Attorney, Agent, or Firm* — Wood Herron & Evans LLP

(57) ABSTRACT

A support frame assembly comprises a base and an object support member having a first position and a second position. The support frame assembly may also include a plurality of pivot arms operatively connected to the base and the object support member. At least one of the pivot arms may have an actuator for moving the object support member form the first position to the second position. The support frame assembly may also include an adjustment member operatively connected to one of the plurality of pivot arms to adjust a position of the object support member relative to the base for self-alignment between an object such as a tubular member and a drill head.

11 Claims, 19 Drawing Sheets

(56) References Cited

U.S. PATENT DOCUMENTS

| | | | | |
|---|---|---|---|---|
| 7,635,249 | B2* | 12/2009 | Guidroz | E21B 19/14 414/22.52 |
| 8,950,996 | B2* | 2/2015 | Hilton | E21B 19/14 414/22.55 |
| 9,267,342 | B2* | 2/2016 | Hilton | E21B 19/15 |
| 9,551,193 | B2* | 1/2017 | Cheeseman | E21B 19/15 |
| 2008/0038094 | A1* | 2/2008 | Guidroz | E21B 19/14 414/22.61 |
| 2011/0206484 | A1 | 8/2011 | Vehmeijer et al. | |
| 2014/0028042 | A1* | 1/2014 | LaValley | E21B 19/155 294/198 |
| 2014/0356120 | A1* | 12/2014 | Seed | E21B 19/155 414/745.1 |

* cited by examiner

APPARATUS AND METHOD FOR A PIPE HANDLING SYSTEM

This application claims priority from a provisional patent application having Ser. No. 62/076,883, which was filed Nov. 7, 2014, the entirety of which is incorporated herein by reference.

BACKGROUND

Drilling operations require drilling of deep bores. Sometimes drilling is for soil testing, and other applications include drilling to remove oil, gas or other matter from beneath the earth's surface. Currently, in order to position objects, such as drill rods or casings onto a drill head, alignment of the threads of the object and the drill head needs to be done with extreme precision to ensure proper thread engagement. Currently the precision required is accomplished by fixing a device directly to the drilling rig to maintain proper alignment between the objects and the drill head.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

A support frame assembly may comprise a base and an object support member having a first position and a second position. The support frame assembly may also include at least one arm member operatively connected to the base and the object support member. The arm member may have an adjustment member configured to adjust a position of the object support member relative to the base. The support frame assembly may have an actuator for moving the object support member from the first position to the second position.

In another implementation, the support frame assembly may have a first pivot arm and a second pivot arm, where the adjustment member may be operatively connected to the second pivot arm to adjust the angle of the object support member in a substantially vertical plane relative to the base so that the support frame assembly can be self-aligning for engaging an associated object with an associated rotating drill head.

In another implementation of the support frame assembly the adjustment member may be a first spring and a second spring configured to adjust pressure on the associated object for threadably engaging and disengaging the associated object relative to the associated drill head.

The support frame assembly may also include a first spring operatively connected to one of the plurality of pivot arms to adjust a position of the object support member relative to the base. Additionally, the object support member may be able to accommodate a variety of sizes of objects that may be presented to the drill head. The support frame assembly may also include a plurality of actuators to aid in aligning the frame assembly with the drilling rig.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

BRIEF DESCRIPTION OF THE DRAWINGS

What is disclosed herein may take physical form in certain parts and arrangement of parts, and will be described in detail in this specification and illustrated in the accompanying drawings which form a part hereof and wherein.

DETAILED DESCRIPTION

Figure 1:
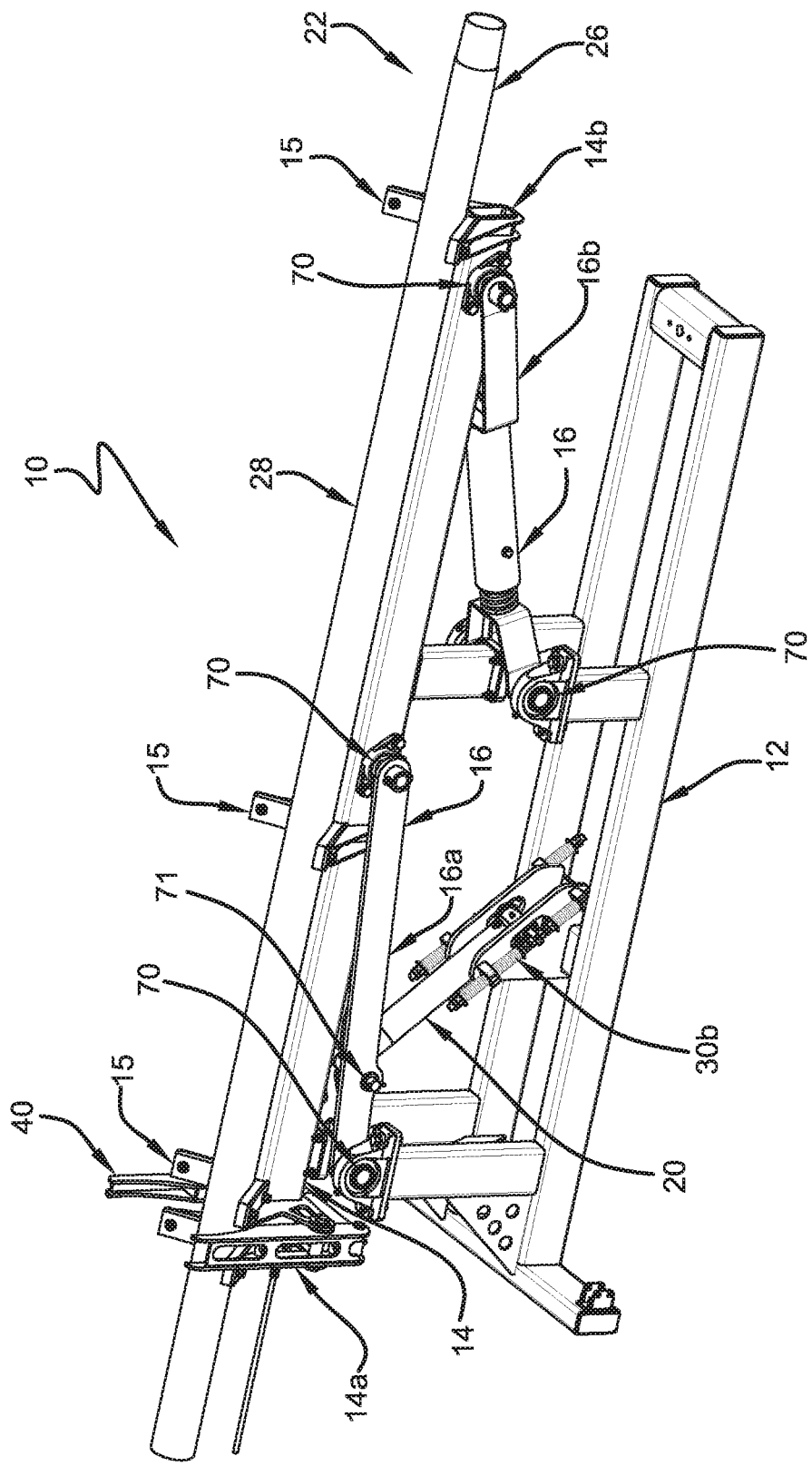
FIG. 1 is a perspective view of the present invention.
Figure 2:
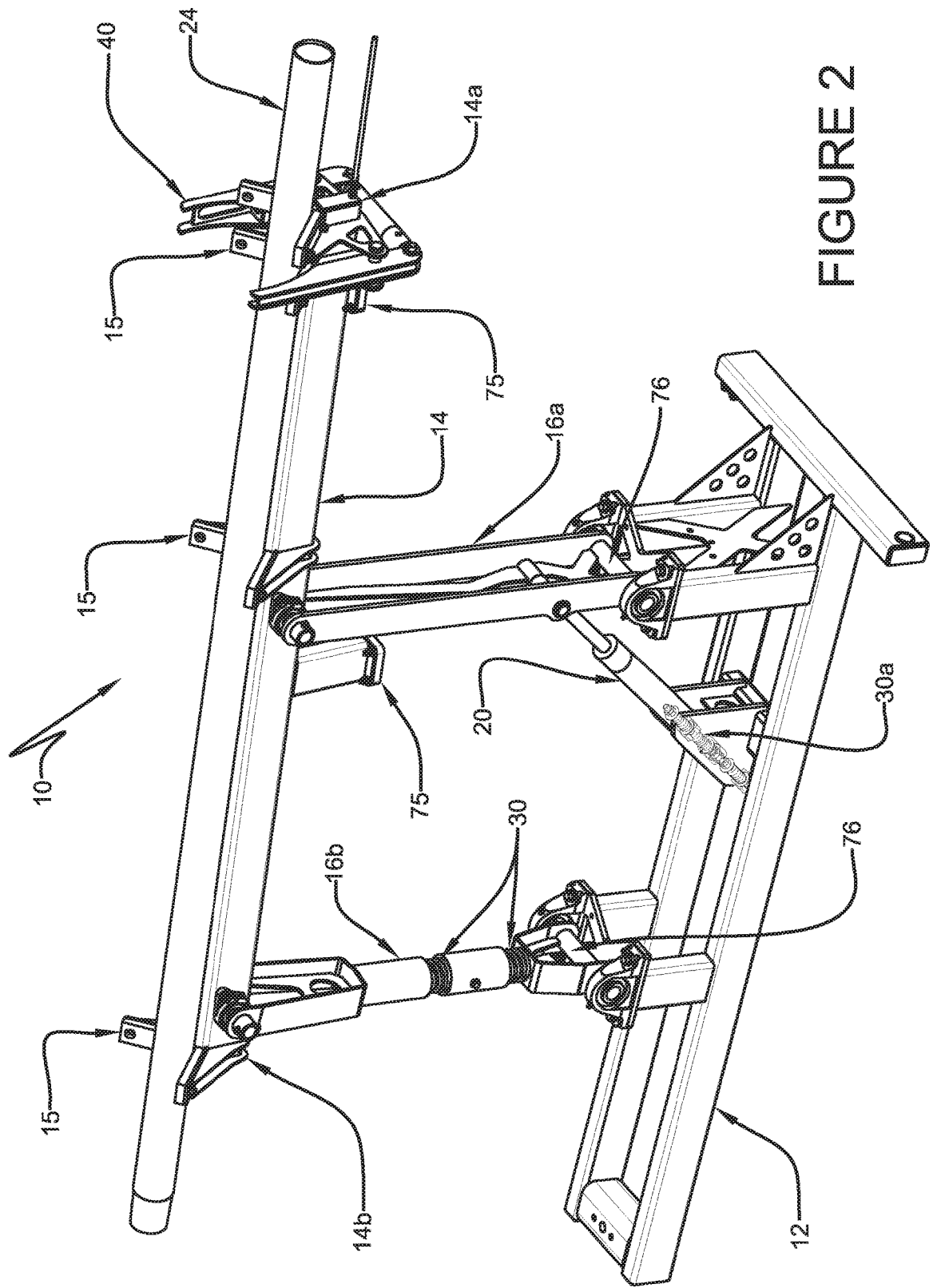
FIG. 2 is another perspective view of the present invention.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices may be shown in block diagram form in order to facilitate describing the claimed subject matter.

Figure 3:
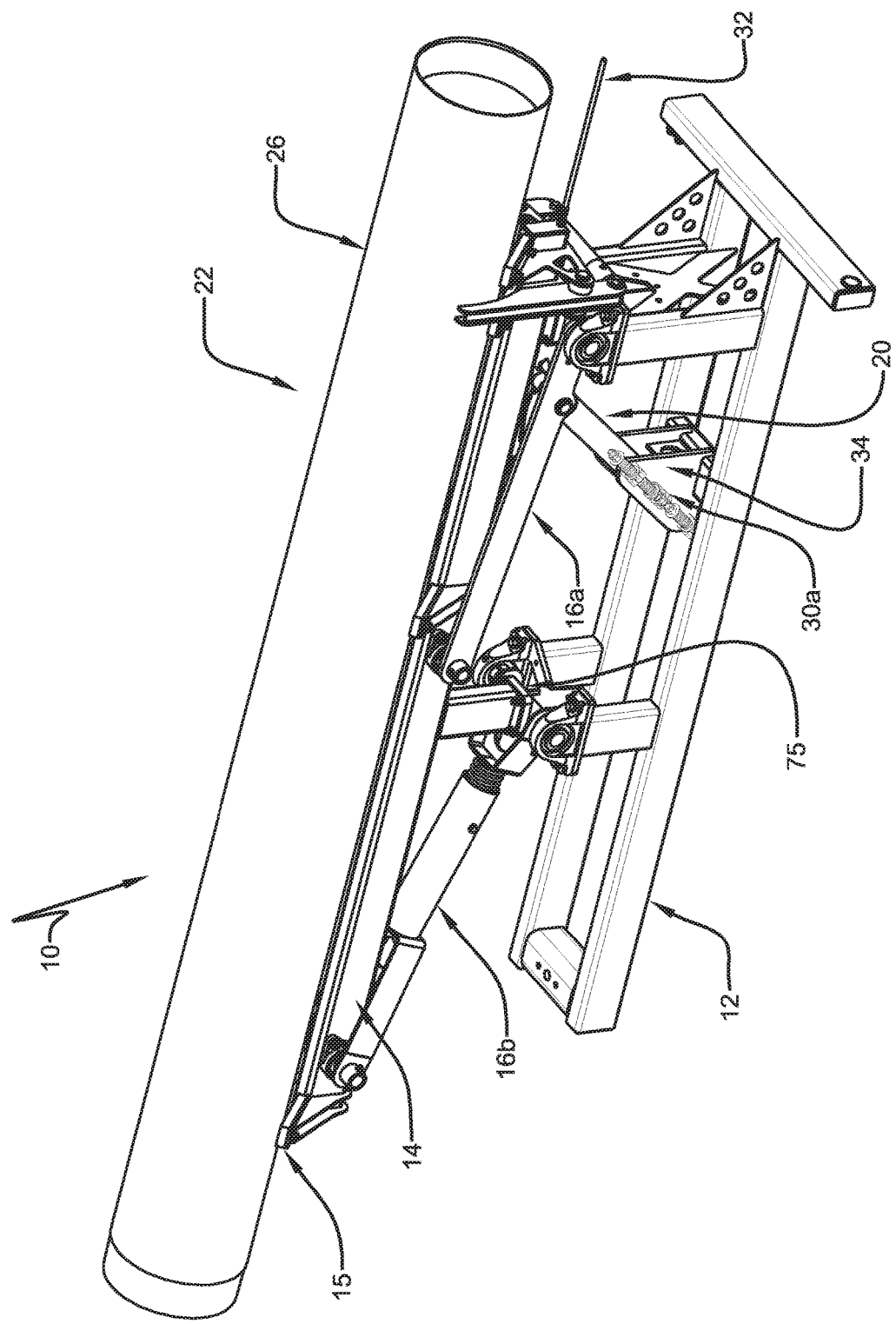
FIG. 3 is another perspective view of the present invention.
Figure 4:
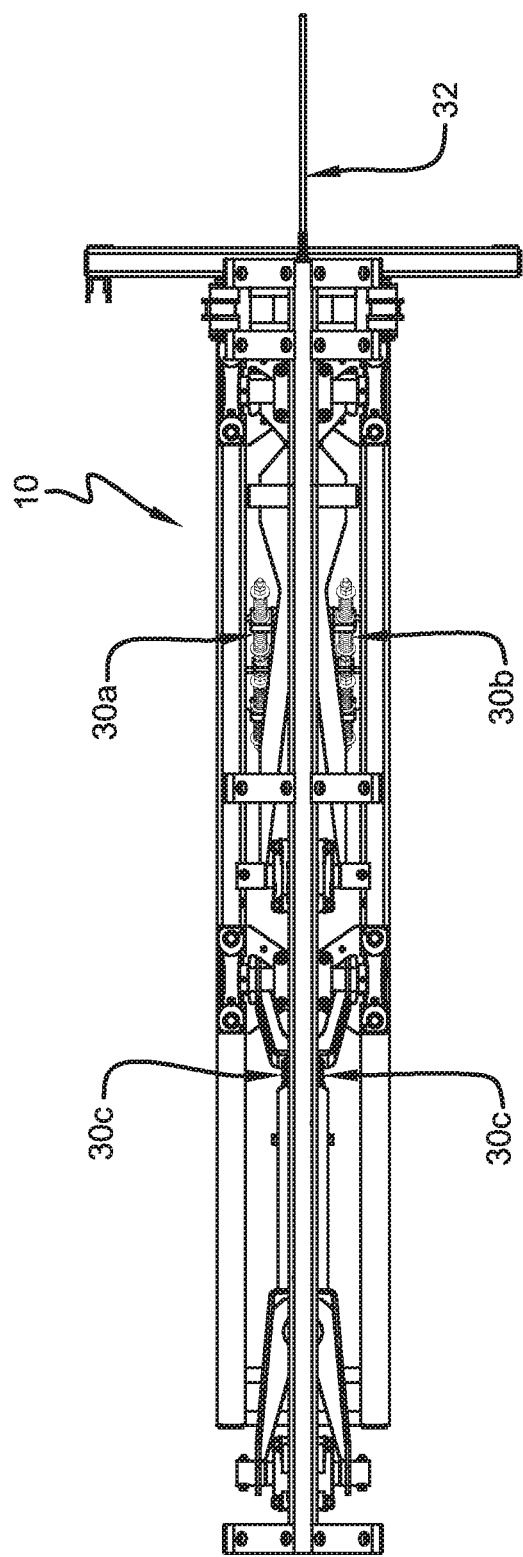
FIG. 4 is top plan view of the present invention.
Figure 5:
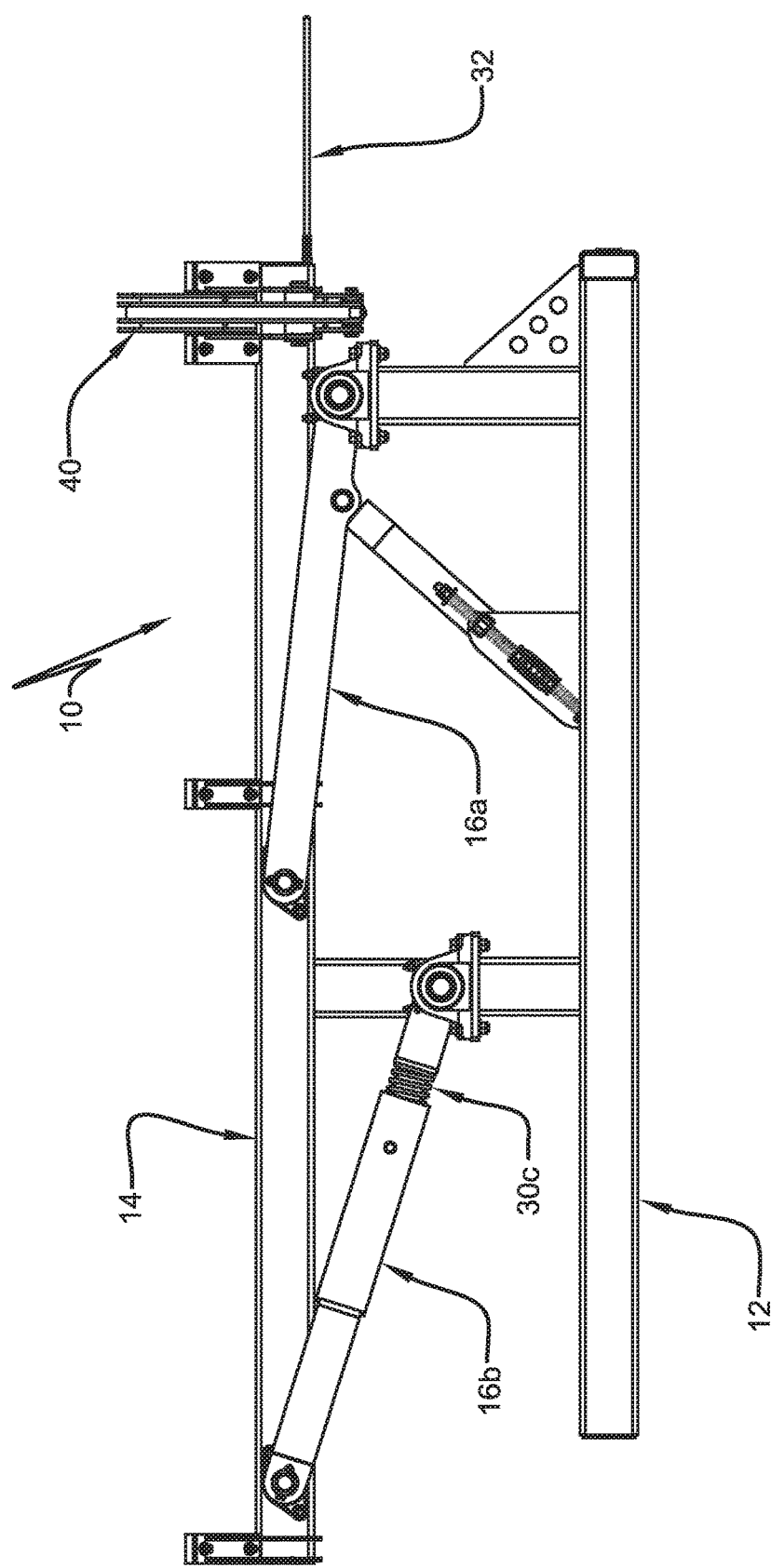
FIG. 5 is a front elevational view of the present invention.
Figure 6:
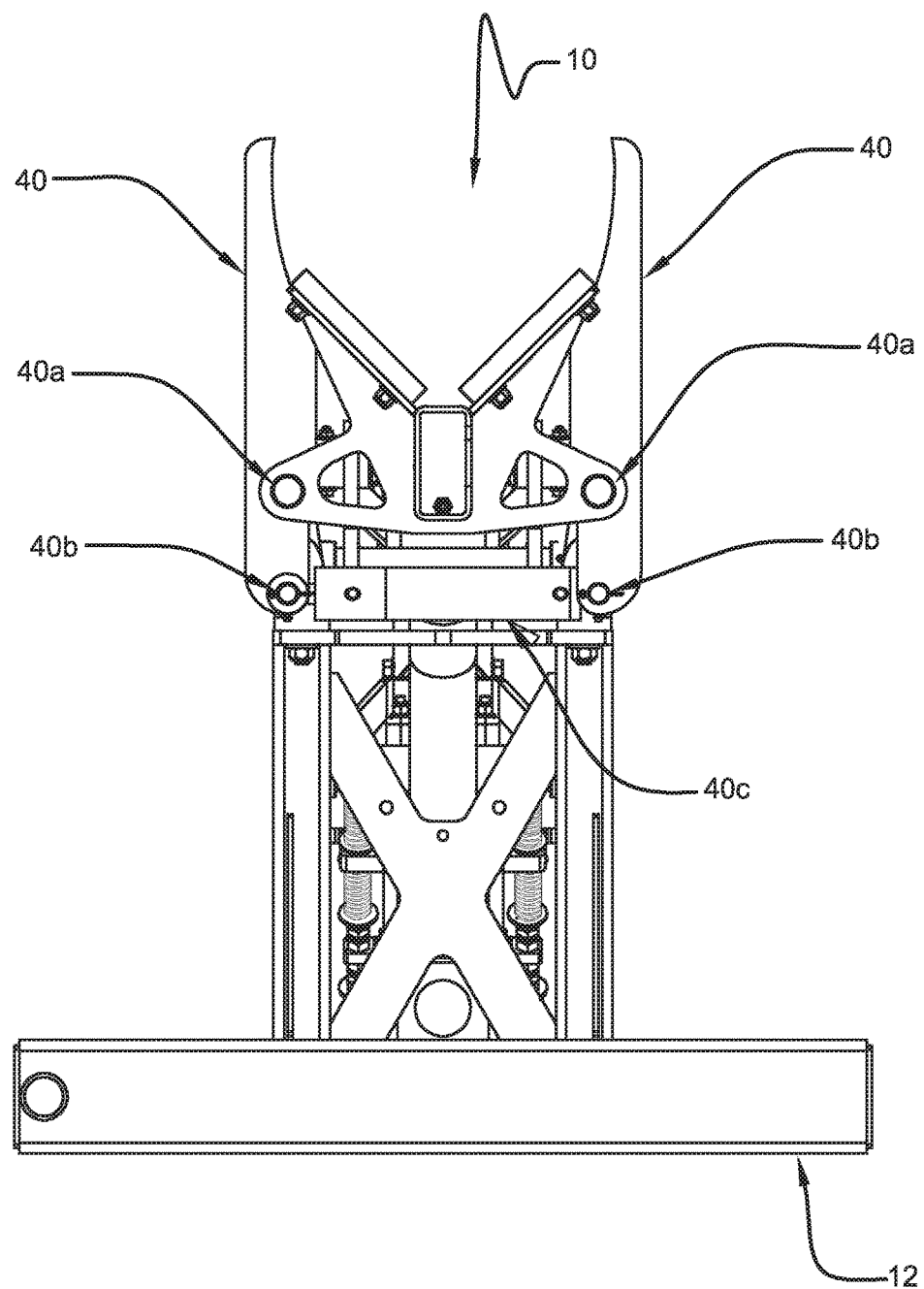
FIG. 6 is a right side elevational view of FIG. 5.
Figure 7:
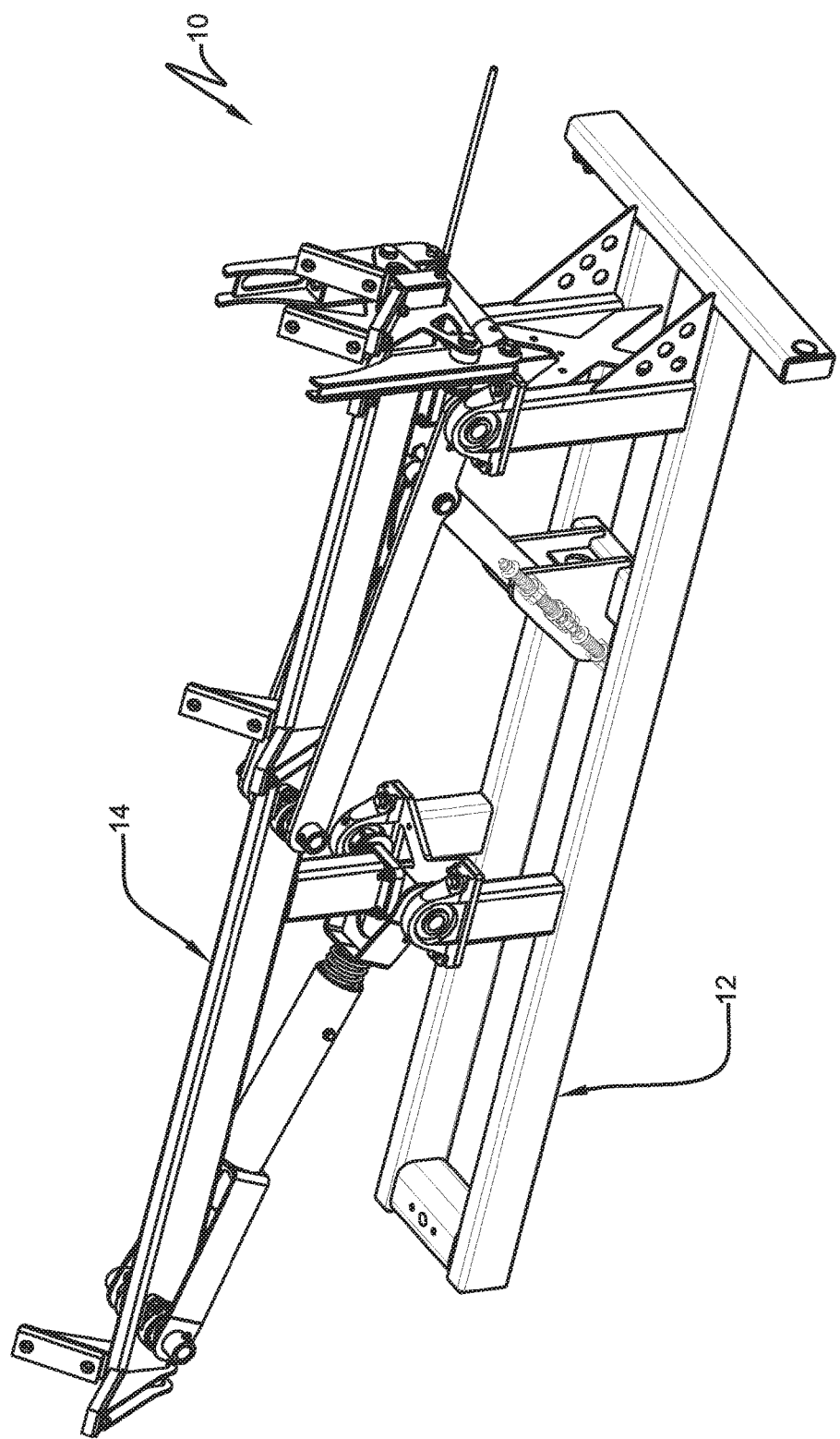
FIG. 7 is another perspective view of the present invention.
Figure 8:
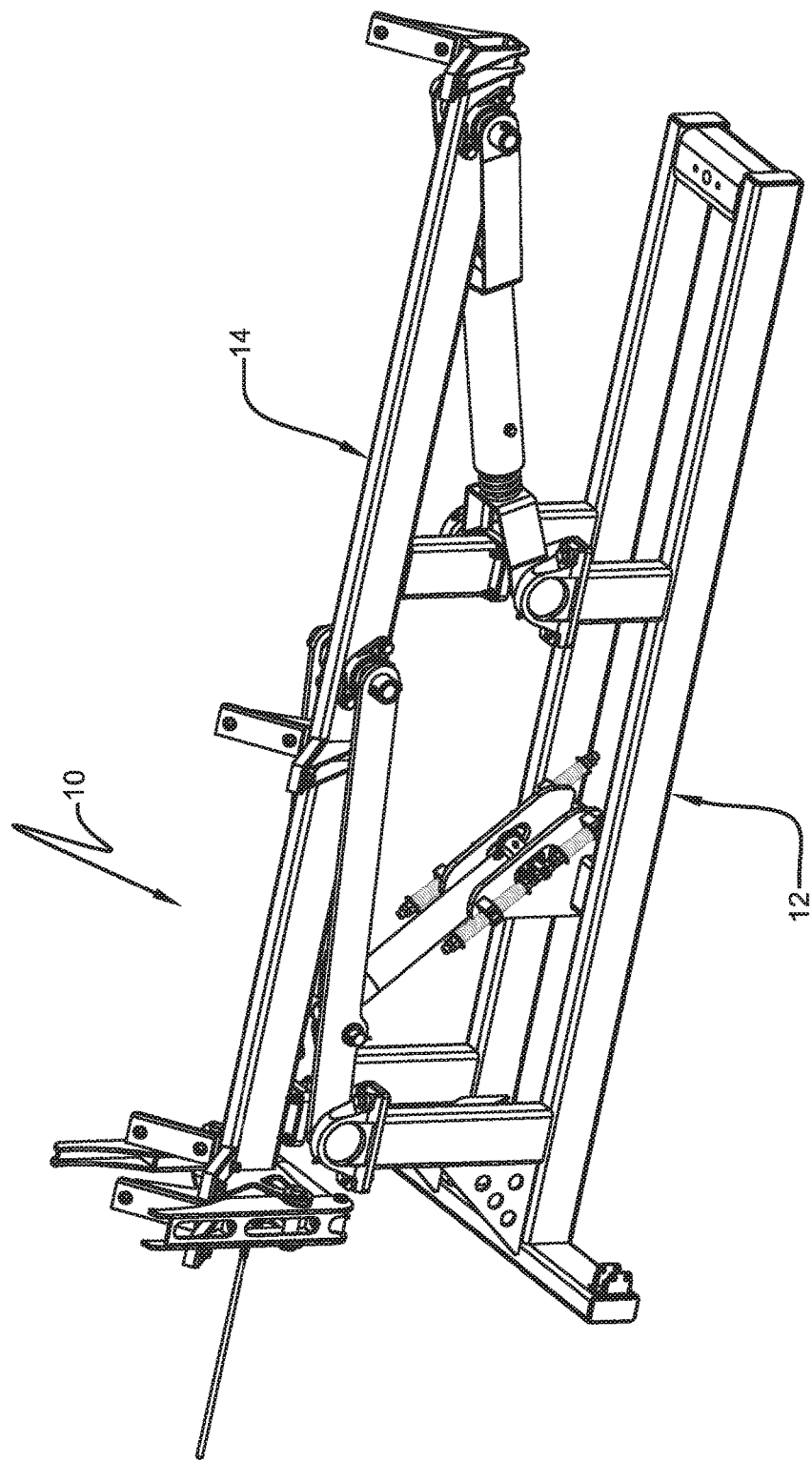
FIG. 8 is another perspective view of the present invention.
Figure 9:
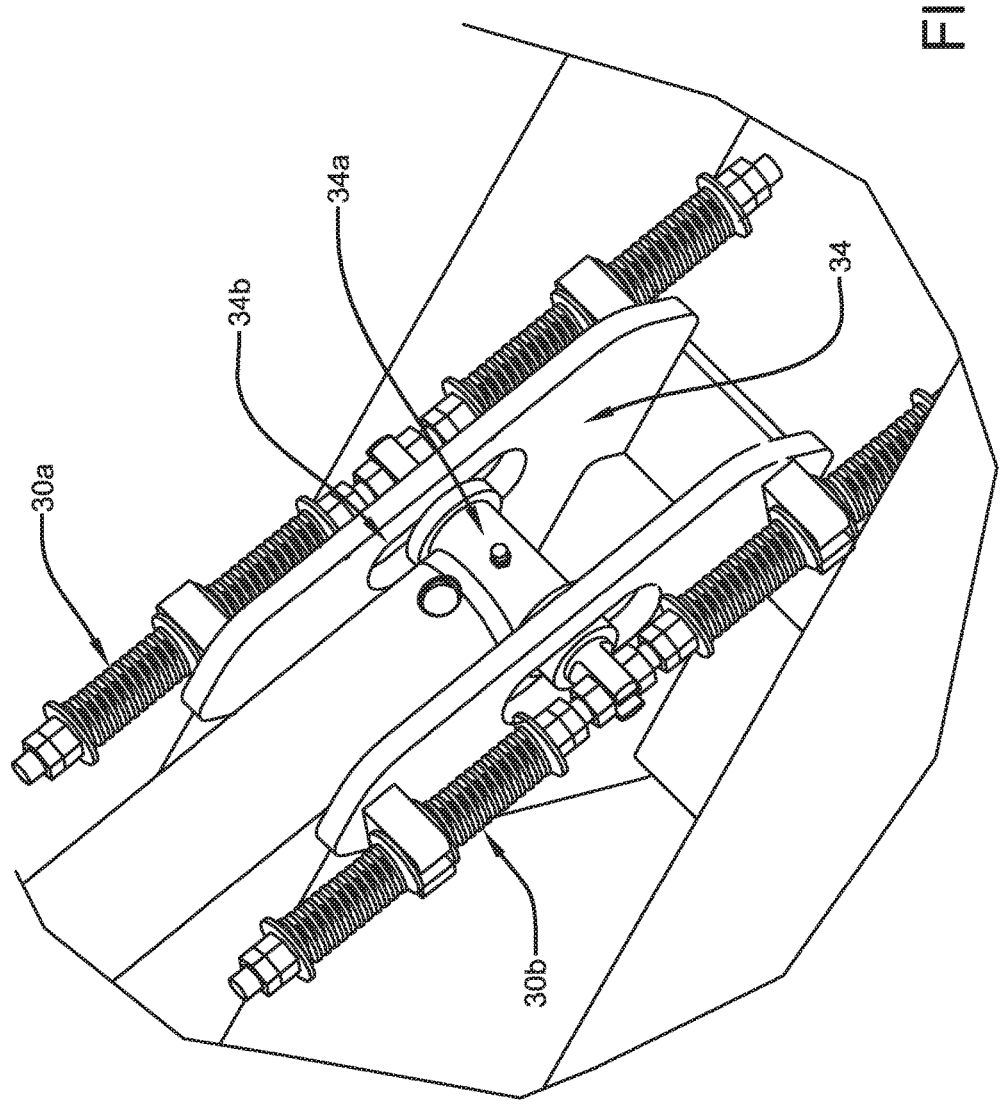
FIG. 9 is another perspective view of the present invention.
Figure 10:
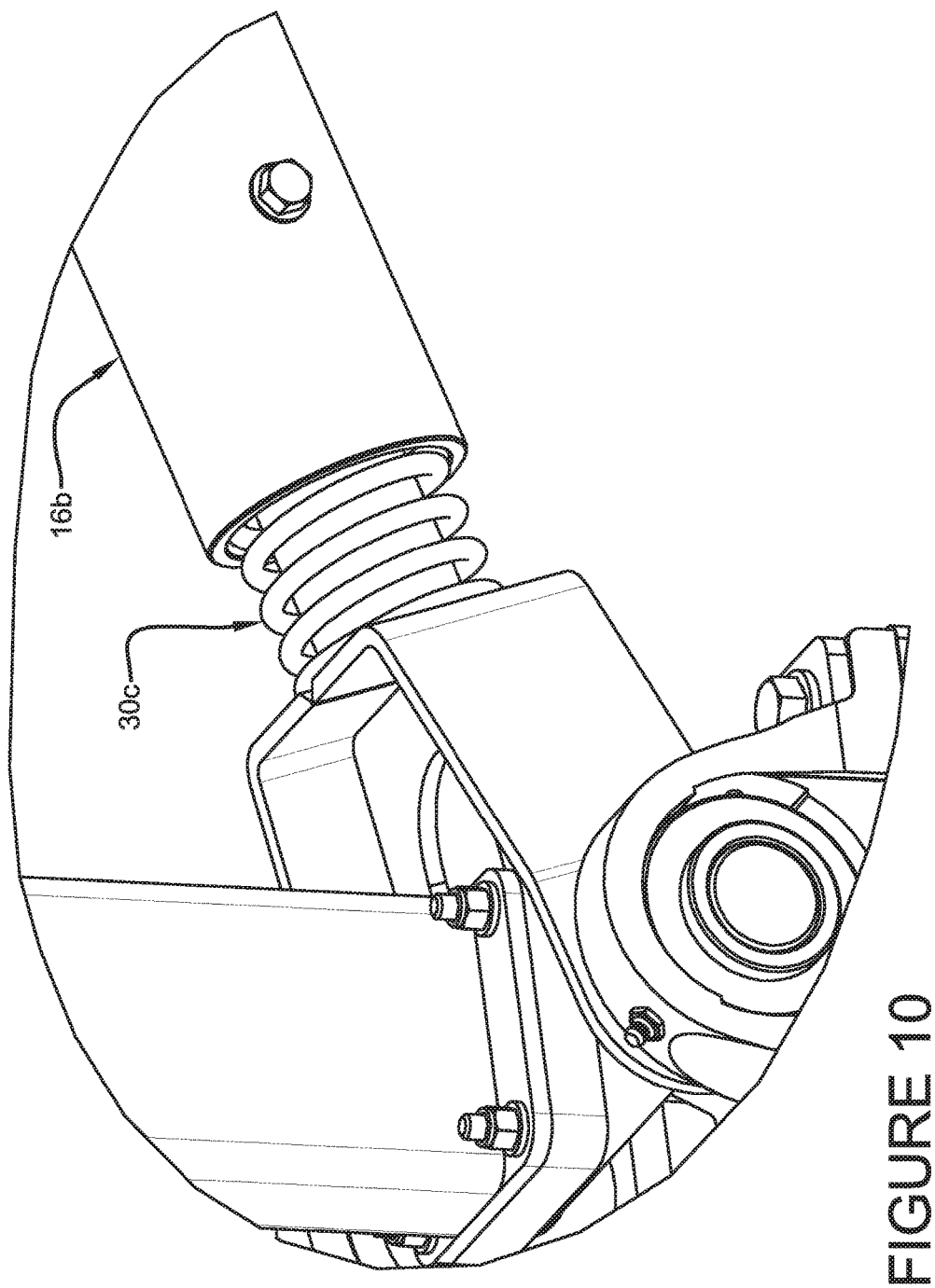
FIG. 10 is another perspective view of the present invention.
Figure 11:
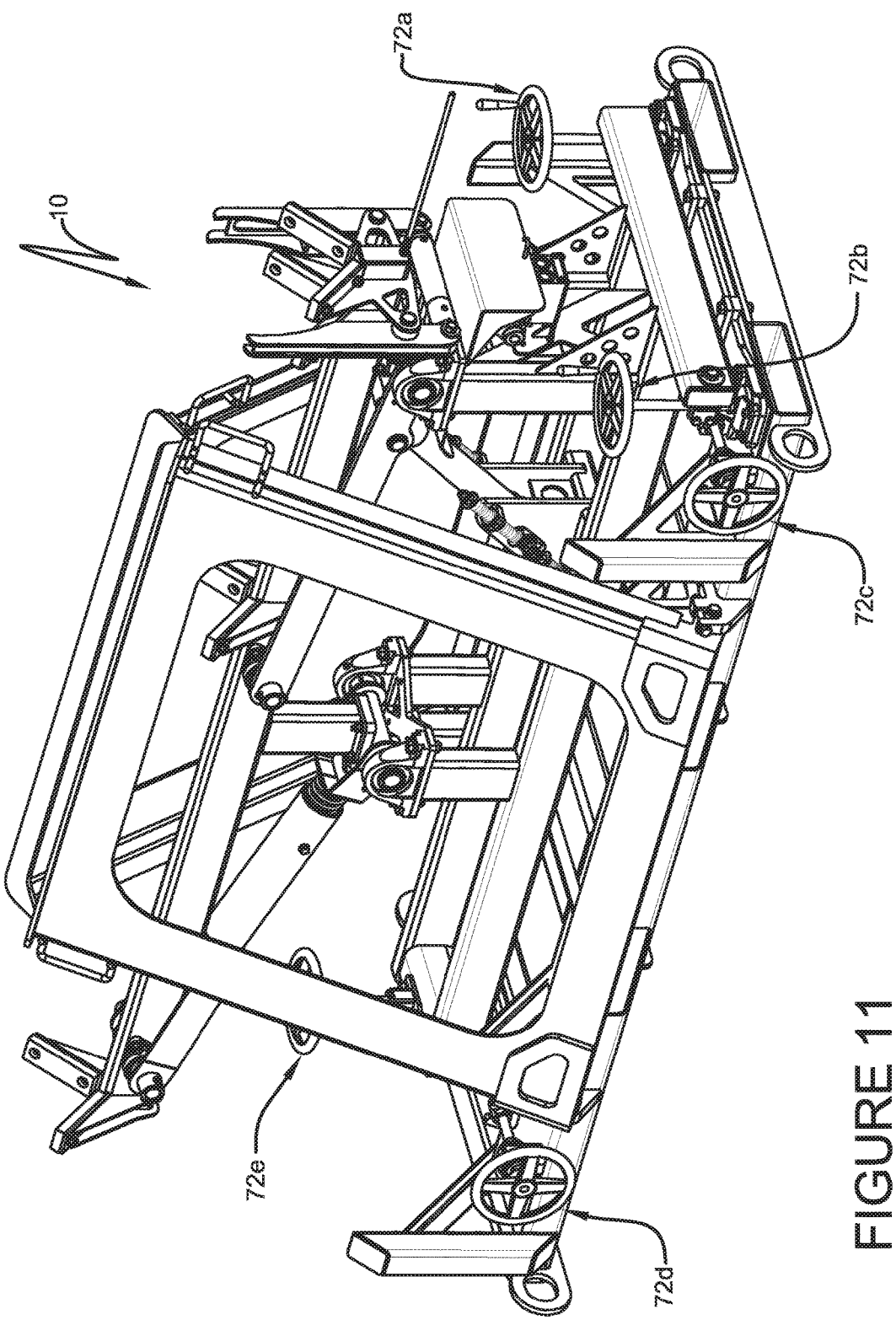
FIGS. 11-19 is another implementation of the present invention.
Figure 12:
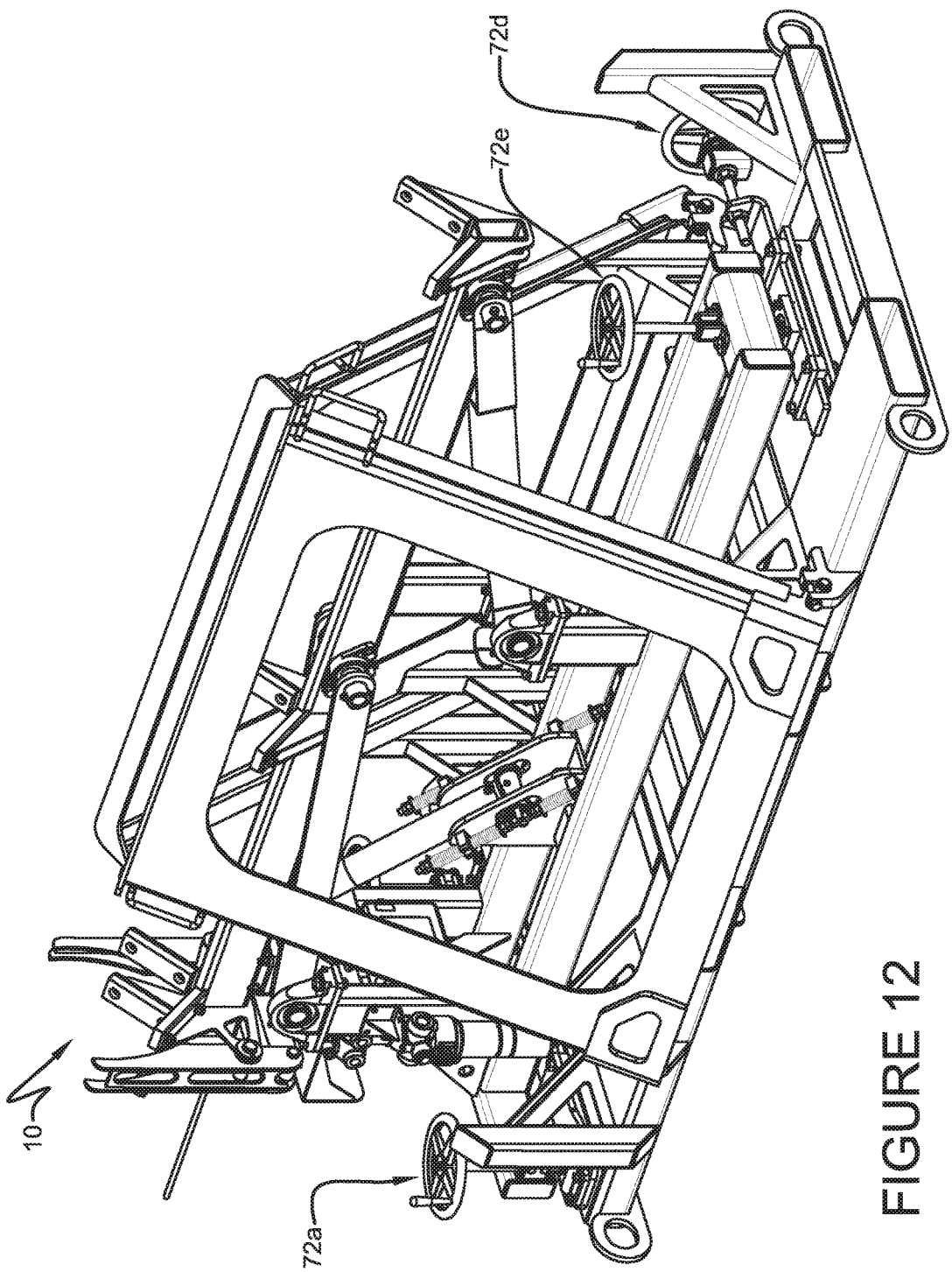
Figure 13:
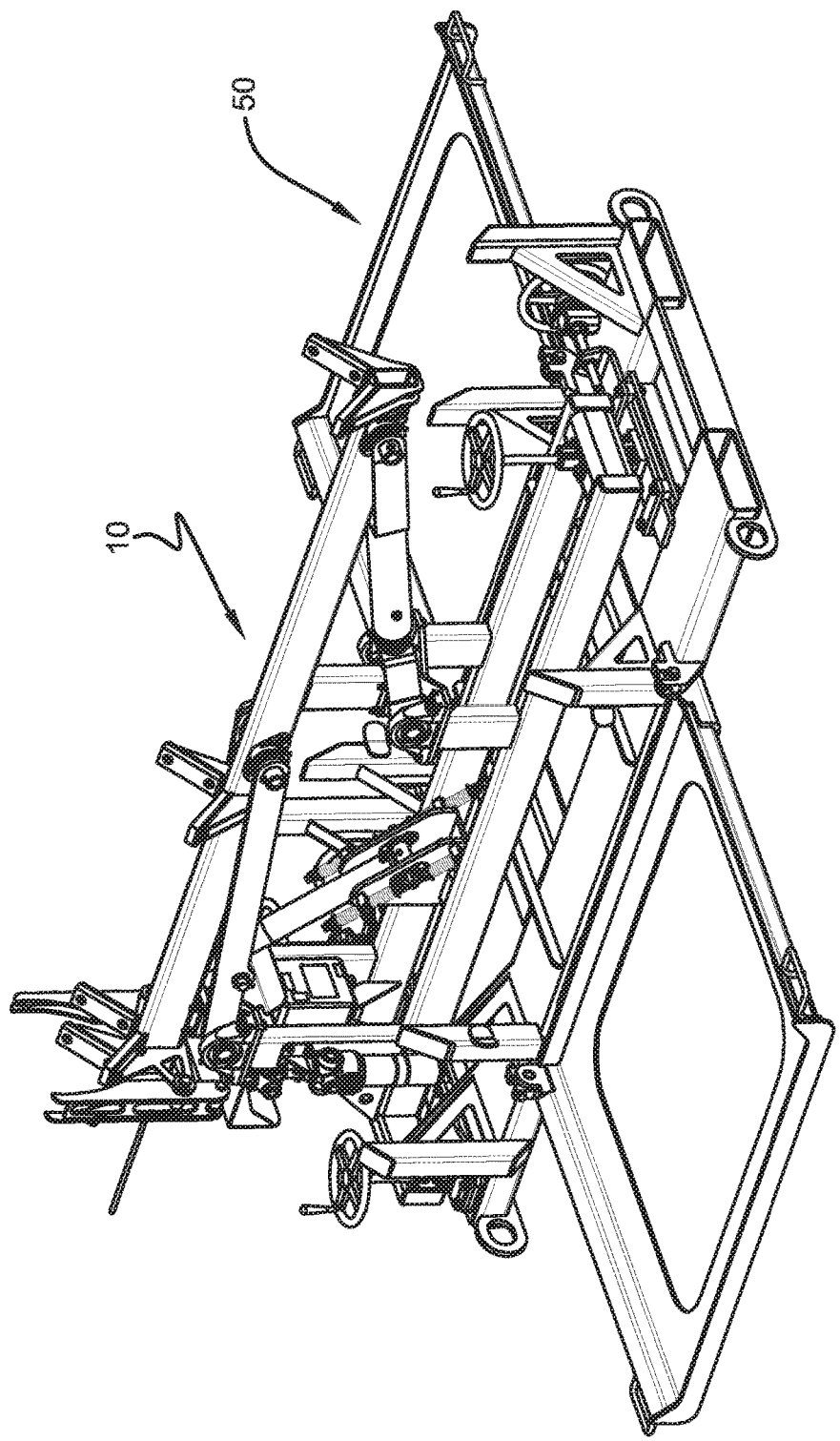
Figure 14:
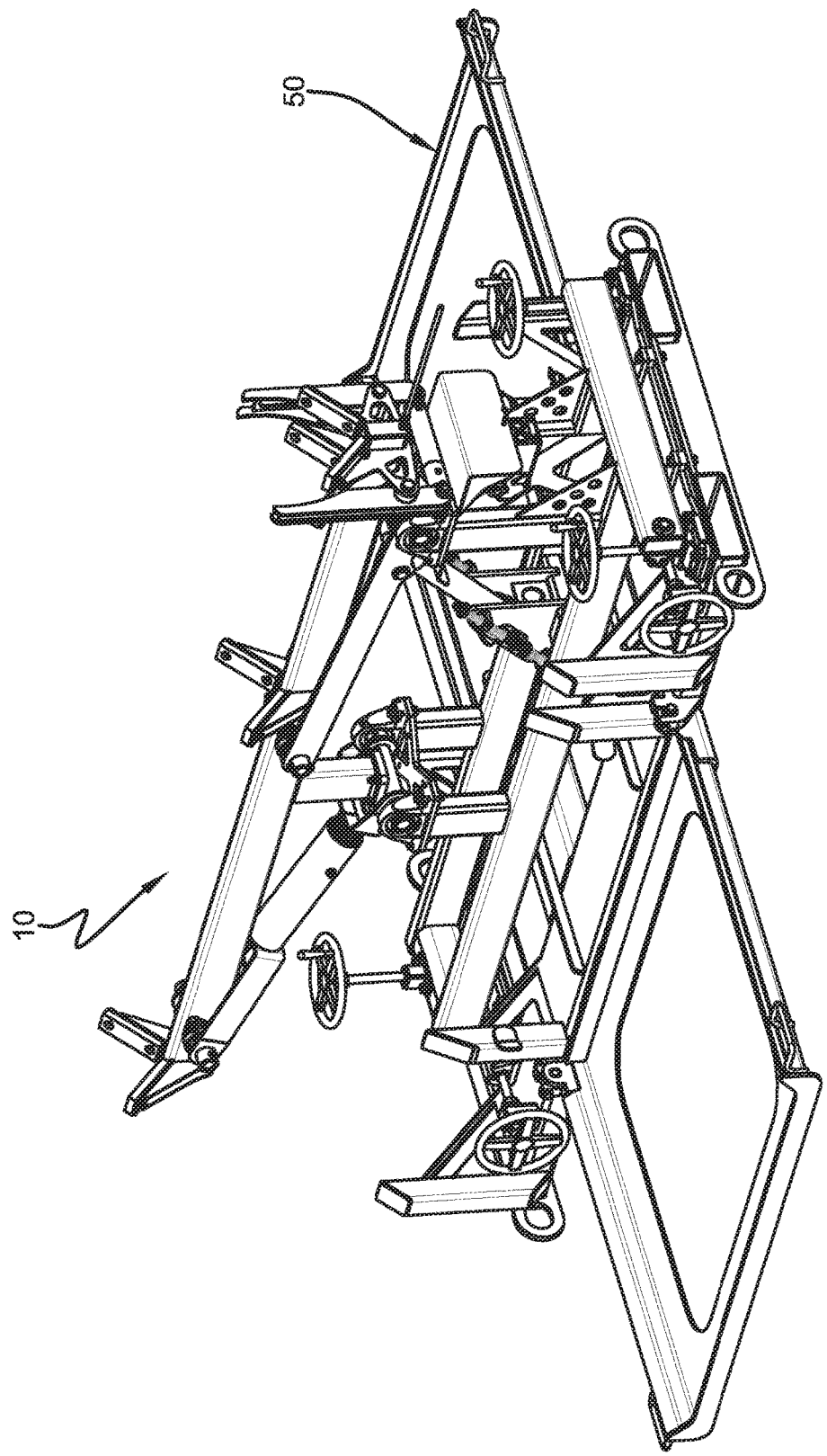
Figure 15:
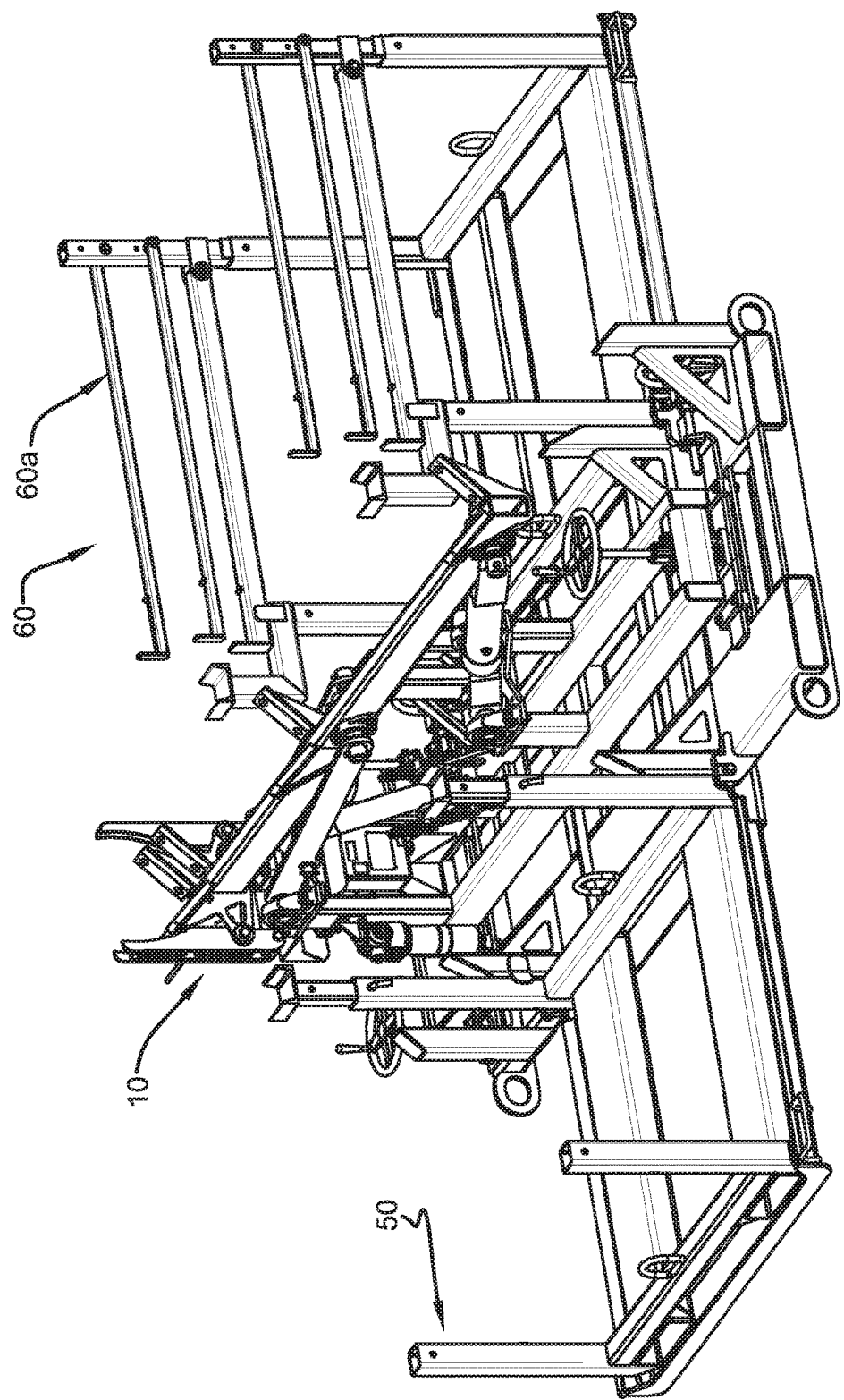
Figure 16:
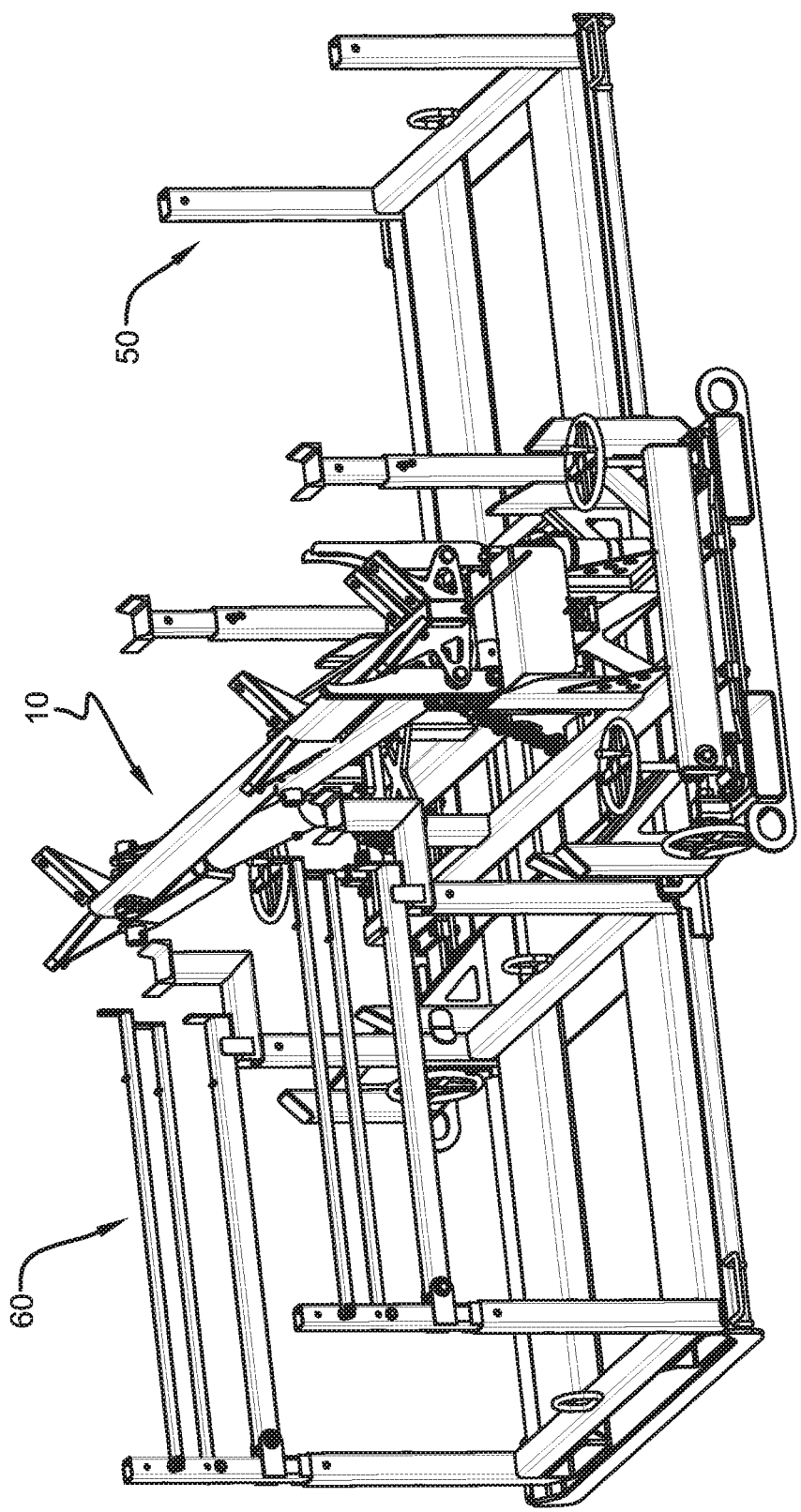

The present invention is depicted in FIGS. 1-19. The claimed device operated independently from the drilling rig yet is able to maintain ensure proper thread engagement. A support frame assembly 10 may comprise a base 12 and an object support member 14 having a first position and an elevated second position. The support frame assembly 10 may also include at least one arm member or a plurality of pivot arms 16 operatively connected to the base 12 and the object support member 14. The pivot arm 16 connection to the base 12 and the object support member 14 may be accomplished through any means chosen with sound engineering judgment, including without limitation, by means of bearings 70. At least one of the pivot arms 16 may have an actuator 20 for moving the object support member 14 from the first position to the second position. The first position may be maintained by a plurality of support pads 75 that contact a pin structure 76 on the base 12. The support pads 75 may be coated with a non-marring treatment to prevent damage or excessive wear to the pin structure 76 when the support frame assembly 10 is in the first position as shown in FIG. 3.

The support frame assembly 10 may also include an adjustment member that may take the form of springs. In one implementation, a first spring 30 may be operatively connected to one of the plurality of pivot arms 16 to adjust a position of the object support member 14 relative to the base 12. The plurality of pivot arms 16 may include a first pivot arm 16a and a second pivot arm 16b. In one implementation, the first pivot arm 16a may have an upper portion that may rotationally connect at one end to the object support member 14. A lower portion may interconnect the upper portion to the base 12. In another implementation, the upper portion of the first pivot arm 16a may provide a connection point for the actuator 20. The second pivot arm 16b may also have an upper portion that may rotationally connect to the object support member 14. It may also have a lower portion that connects to the based. In one implementation, the second pivot arm 16b may have an intermediate portion comprising a spring 30c and sleeve, which is discussed further below.

The support frame assembly 10 may be configured to support an associated object 22. The associated object may be a tubular member such as a casing 26 or drill rod 24, but is not limited thereto. The support frame assembly 10 may be configured to engage and/or disengage the object 22 to an associated drill head (not shown). The drill head may be rotating in certain implementations. In other implementations, the object 22 may have threads to threadably engage with the drill head. Use of the spring 30, as described herein, provides flexibility with the alignment of the object 22 relative to the drill head such that exact precision is not required when threading the object 22 to the drill head.

The object support member 14 may be a longitudinal member extending substantially parallel above the base 12. The object support member 14 may have a first end 14a and a second end 14b oppositely disposed from the first end 14a. A plurality of pads 15 may be disposed along the length of the object support member. The pads 15 may be positioned in pairs. The pads 15 may be configured to support the object 22 such as in a linear or curved shape but not limited thereto.

The object support member 14 may also include a clamp 40 disposed on the first end 14a of the object support member 14. The clamp 40 may be actuated by any variety of means chosen in accordance with sound engineering judgment, including without limitation, hydraulically, pneumatically, mechanically, electro-mechanically, or remotely through a wireless connection. The clamp 40 may be configured to secure the object 22. The object 22 may be placed in the object support assembly 14 such that the end aligns with the guide 32. A clamp actuator 40a may be connected to both sides of the clamp 40 at attach points 40b. The clamp actuator 40a may be energized causing the clamp actuator 40a to elongate and move the clamp 40 to pivot at the clamp attach point 40c. The pivoting clamp 40 contacts the object 22 and holds it in position. When the object support member 14 is moved to the second elevated position, the drill head will start rotating to engage the threads of the object 22. Once the threads of object 22 are fully engaged, object 22 will start to rotate. Once object 22 begins to rotate, the clamp actuator 40a is de-energized and the clamp 40 moves away from the object 22.

When the object takes the form of a tubular member, such as a casing 26 or drill rod 24, a diameter of the tubular member may range from about three (3) inches to about twelve (12) inches, inclusive of all increments between about three (3) inches and about twelve (12) inches. The length of the object 22 may range from about two (2) feet to about twenty (20) feet, inclusive of all increments between about two (2) feet and about twenty (20) feet.

Figure 17:
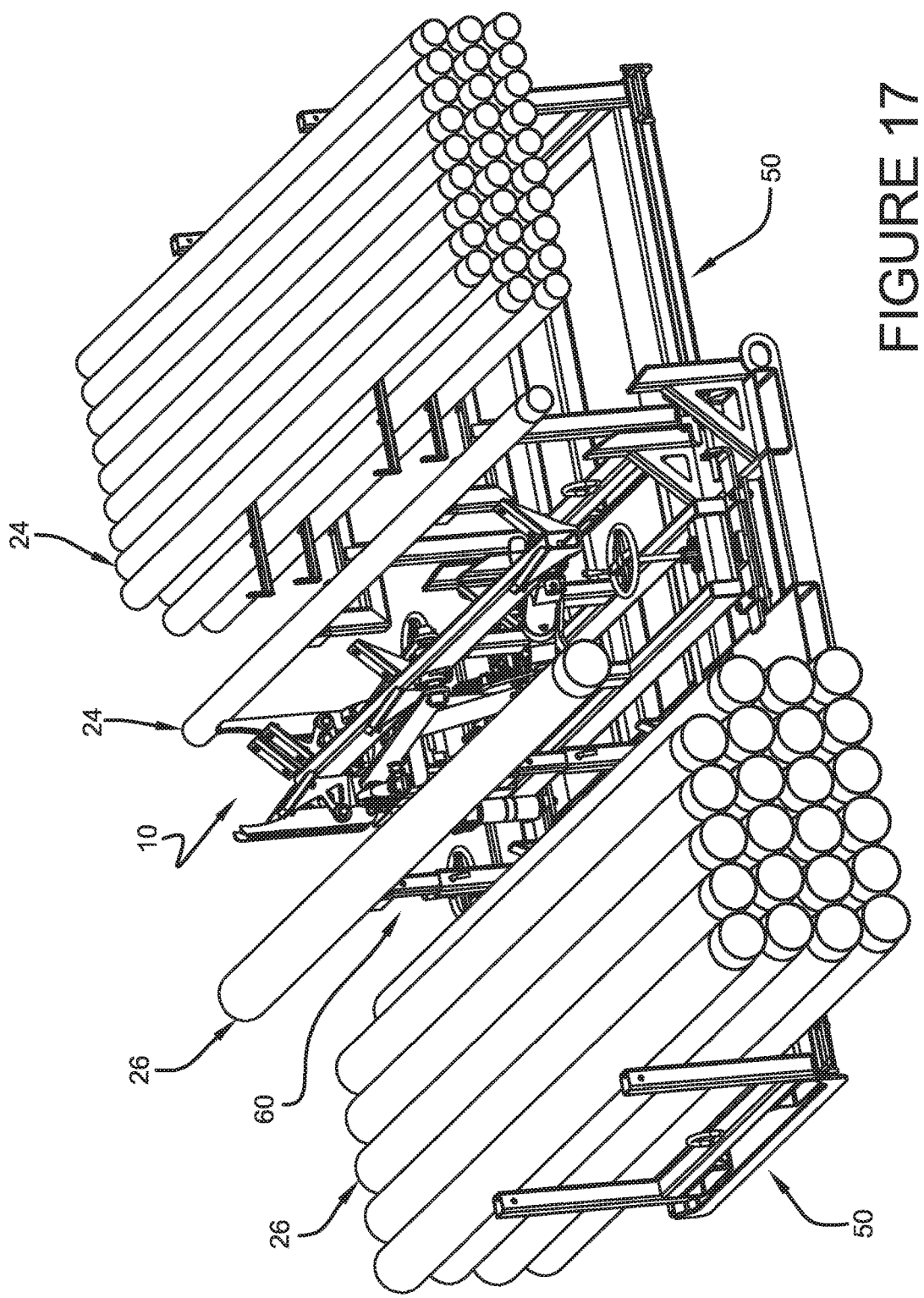
Figure 18:
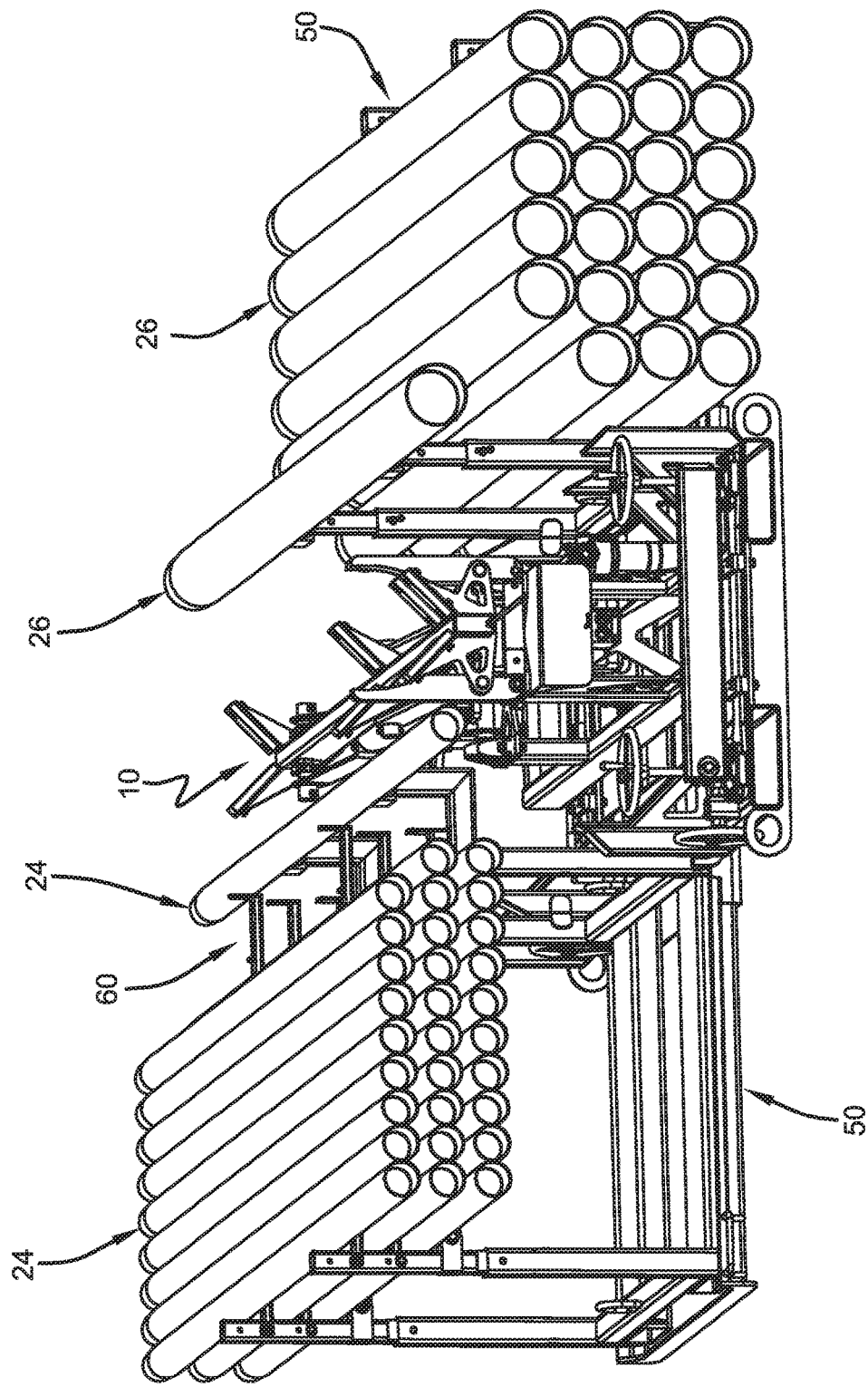
Figure 19:
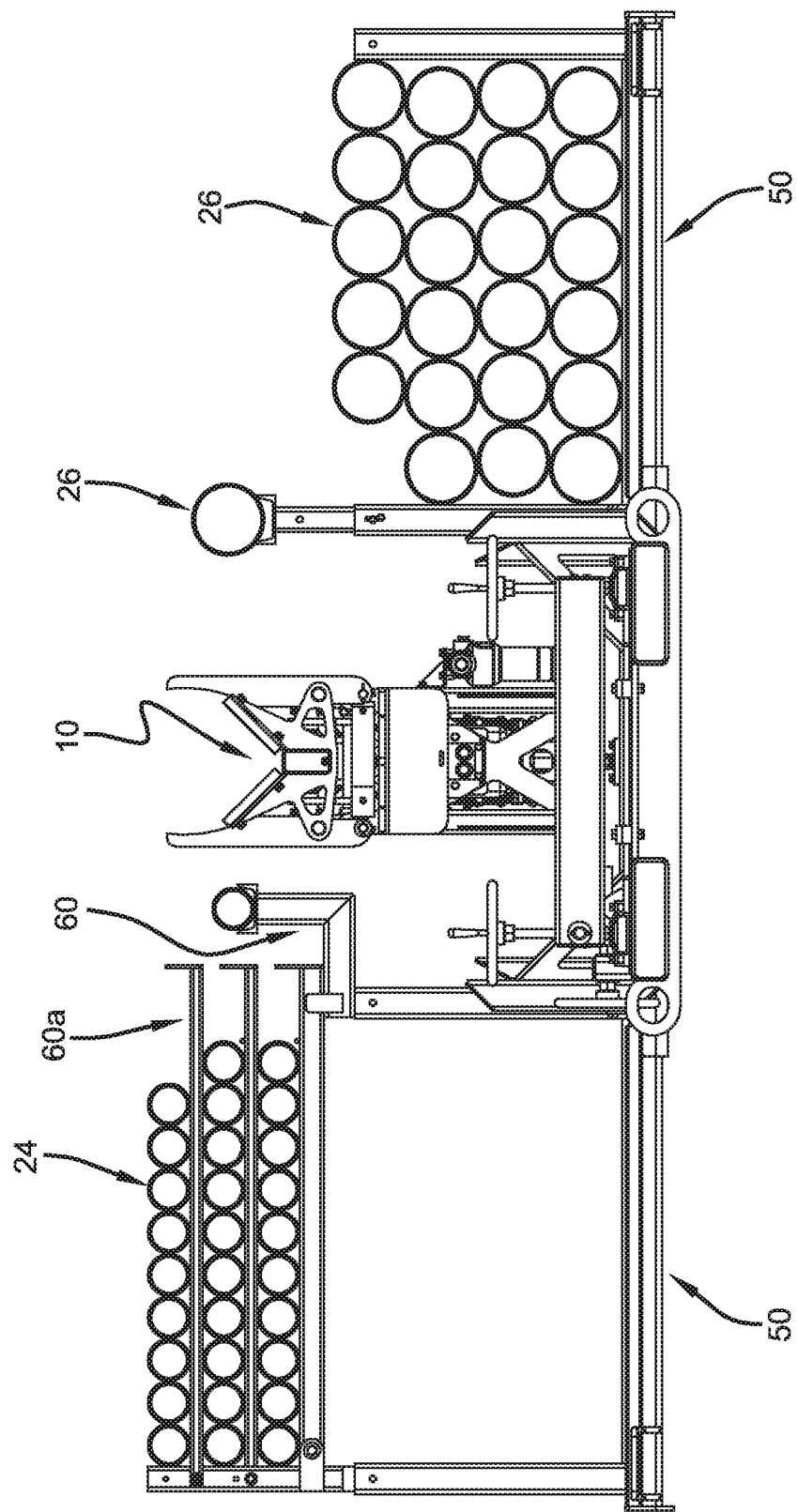

The object support member 14 may also include a guide 32 disposed in proximity to the clamp 40. The guide 32 may take the form of a spring or other small rod in addition to a fastener. The guide 32 may be configured to ensure that as objects 22 are repeatedly placed on the object support member 14, the objects 22 are in the same position relative to the first end 14a of the object support member 14. By way of nonlimiting example, use of the guide 32 may have particular benefit when multiple objects 22 are being loaded into the support frame assembly 10 as shown in FIGS. 17-19.

The base 12, object support member 14, first pivot arm 16a and second pivot arm 16b may form a four bar linkage to carry out the intent of the invention. One of the pivot arms 16a, 16b may include the actuator 20. The actuator 20 may be connected between the base 12 and at some position of either the first pivot arm 16a or the second pivot arm 16b. In one implementation as shown in the FIGURES, the actuator is rotatably connected at one end to the first pivot arm 16a. The actuator 20 may be actuated by any variety of means chosen in accordance with sound engineering judgment, including without limitation, hydraulically, pneumatically, mechanically, electro-mechanically, or remotely through a wireless connection. The actuator 20 may move the object support member 14 from a first lower position to a second elevated position. When the object support member 14 is in the second elevated position, the object 22 may then be engaged or disengaged from a second object, such as the drill head.

The base 12 may also include a bracket 34. A first set of springs 30a, 30b may be disposed with a pin 34a on either side of the bracket. The pin 34a may be centered in a slot 34b located in the bracket 34 by the springs 30a, 30b. The set of springs 30a, 30b may enable one end of the actuator 20 to move relative to the base 12. In one implementation, movement of the end of the actuator 20 enables the first end 14a of the object support assembly to move such that misalignment of the object 22 with the drill head may be accommodated. Allowing movement in the object 22 changes the pressure between the object and the drill head as they engage or disengage. The drill head, which may have external threads, may rotate and engage the internal threads of the object 22. The springs 30a, 30b may enable the object 22 to position its threads to align with the drill head as the drill head rotates. As shown in the FIGURES, two springs 30a, 30b are utilized, but the system may also be designed to use one spring or more than two springs at the base to provide for adjustment and the proper alignment of the object during engagement or disengagement with the drill head.

The second pivot arm 16b may also comprise a third spring 30c. The third spring 30c may be configured to adjust an angle of the object support member 14 in a substantially vertical plane relative to the base 12. The third spring, in other words, allows for the "up and down" movement of the object support assembly 14 to enable further self-alignment of the object 22 with the drill head. The third spring 30c may work in conjunction with the first and second springs 30a, 30b. The angle of the object support assembly 14, and thus the object 22, relative to the base 12 does not remain fixed. When the object 22 attempts to engage or disengage from the drill head and some misalignment exists, the third spring 30c is able to accommodate the misalignment such that engagement and disengagement may be accomplished without damage to either the threads on the drill head or the threads on object 22. As shown in the FIGURES, two internal springs 30c may be utilized, but the system may also be designed to use one spring or more than one spring to provide for misalignment of the object 22 relative to the drill head.

The support frame assembly 10 may be equipped with a plurality of adjustment devices 72a, 72b, 72c, 72d, 72e to allow the object support member 14 to align proximately with the drill head. Once the support frame assembly 10 is positioned, the device 72a and 72b may be rotated to raise or lower the vertical position of the support frame assembly 10. Device 72b can be rotated to move the assembly 10 from "side to side." Likewise device 72e can be rotated to raise or lower the opposite end of the support frame assembly 10 and device 72d can be rotated to move the opposite end of the assembly 10 from side to side. The devices 72a, 72b, 72c, 72d, and 72e are used to provide course alignment of the object 22 with the drill head. Additionally, since the support frame assembly 10 may be placed on the ground at a distance from the drill head and since the ground is invariably not level, the devices 72a, 72b, 72c, 72d, and 72e can be used to level the support frame assembly 10 with the drill head. The devices 72a, 72b, 72c, 72d, and 72e may be actuated by any variety of means chosen in accordance with sound engineering judgment, including without limitation, hydraulically, pneumatically, mechanically, electromechanically, or remotely through a wireless connection.

In use, the support frame assembly 10 may be in a fixed position. If the fixed position is not level with the drill head, devices 72a, 72b, 72c, 72d, and 72e may be used to adjust the assembly 10. The object 22, such as a casing 26 or drill rod 24 may be positioned on the object support assembly 14. The end of the casing 26 may be aligned with the guide 32 to ensure the casing 26 is in the correct position. The clamp actuator 40a may be energized to enable the clamp 40 to hold the casing 26 in position. The actuator 20 may be activated causing rotation of the first pivot arm 16a and the second pivot arm 16b. The casing 26 is elevated until the support frame assembly 10 reaches the second position. The second position may be determined by the stroke of the actuator 20. As the casing 26 is elevated to the drill head, contact with the drill head may cause the third spring 30c to deflect upwardly or downwardly such that the casing 26 aligns with the drill head. The casing 26 begins to thread itself via internal threads onto the drill rig's external threads. The set of springs 30a, 30b may provide additional self-alignment to enable proper thread engagement and prevent binding of drill head and casing 26. Once the threads are engaged, the casing 26 will move in unison with the rotating drill head. Once the casing 26 begins to rotate, the clamp actuator 40a is de-energized to release the clamp 40. Conversely, the drill head may rotate in the opposite direction to disengage the threads of the casing 26. When the drill head is disengaging from the casing 26, the clamp 40 is engaged by energizing the clamp actuator 40a thereby holding casing 26 in position.

The object support member 14 and the base define a first length L1 when the object support member is in the first position. L1 may be about two feet. The first end of the object support member and the base define a length L2 when the object support member is in the second elevated position. The distance L2 may be about ten feet or twelve feet. When the third spring 30c provides upward movement, the first end of the object support member 14 may exceed L2. However, the adjustment upwardly or downwardly resulting from the third spring 30c may be about eighteen inches or less. Further, when the first spring 30a and the second spring 30b provide self-alignment, the distance traveled between the object relative to the drill head may be less than about eighteen inches. The actuator 20 provides for the large adjustment in the range of multiple feet. The actual range of distance described herein of L1, L2 is exemplary and any height may be designed and chosen with sound engineering judgment. The springs 30a, 30b, 30c provide for fine tune adjustment to enable self-alignment and proper engagement between the object 22 and the drill head. The ranges provided herein for the distance of movement for the spring is also exemplary and any range may be designed and chosen in accordance with sound engineering judgment.

FIGS. 11-19 illustrate another implementation of the present invention. Object racks, such as object racks 50, object rack extenders 60 with object spacer 60as, are shown. These attributes enable for loading of objects 22, such as casings 26 or drill rod 24, onto the support frame assembly.

The word "exemplary" is used herein to mean serving as an example, instance or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, at least one of A and B and/or the like generally means A or B or both A and B. In addition, the articles "a" and "an" as used in this application and the appended claims may generally be construed to mean "one or more" unless specified otherwise or clear from context to be directed to a singular form.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. Of course, those skilled in the art will recognize many modifications may be made to this configuration without departing from the scope or spirit of the claimed subject matter.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure.

In addition, while a particular feature of the disclosure may have been disclosed with respect to only one of several implementations, such feature may be combined with one or more other features of the other implementations as may be desired and advantageous for any given or particular application. Furthermore, to the extent that the terms "includes," "having," "has," "with," or variants thereof are used in either the detailed description or the claims, such terms are intended to be inclusive in a manner similar to the term "comprising."

What is claimed is:

1. A support frame assembly for aligning a tubular member relative to a drill head, comprising:
   a base;
   an object support member having a first position and an elevated second position, the object support member configured to retain the tubular member;
   a plurality of pivot arms operatively connected to the base and the object support member; at least one of the pivot arms having an actuator for moving the object support member from the first position to the second position;
   at least one spring operatively connected to one of the plurality of pivot arms to move the object support member relative to the base in a self-aligning manner, thereby enabling self-aligning movement of the tubular member relative to the drill head to provide self-alignment of the tubular member with the drill head.

2. The support frame assembly of claim 1, wherein the plurality of pivot arms comprises a first pivot arm and a second pivot arm, wherein the at least one spring further comprises a first spring operatively connected to the second pivot arm to adjust the angle of the object support member in a substantially vertical plane relative to the base, the first spring configured to provide the self-alignment of the tubular member with the drill head.

3. The support assembly of claim 2, wherein the at least one spring further comprises a second spring and a third spring operatively connected to the first pivot arm, the second spring and the third spring configured to allow movement of the tubular member relative to the drill head to provide the self-alignment of the tubular member with the drill head upon changes of pressure between the tubular member and the drill head.

4. The support frame assembly of claim 1, wherein the object support member has a first end and a second end, the base has a first end and a second end, the first end of the object support member and the first end of the base define a vertical first length L1 when the object support member is in the first position, the first end of the object support member and the first end of the base define a vertical second length L2 when the object support member is in the second position, wherein L2 is greater than L1.

5. The support frame assembly of claim 4, wherein a difference between L1 and L2 is about ten feet.

6. The support frame assembly of claim 5, wherein the spring is configured to enable self-aligning movement of the object support member a distance D1.

7. The support frame assembly of claim 6, where D1 is about eighteen inches.

8. The support frame assembly of claim 1, further comprising a clamp operatively connected to the object support member and configured to receive the tubular member for engagement with the drill head.

9. The support assembly of claim 1, wherein the object support member further comprises at least two pads configured to support various shapes of the tubular member.

10. A method for aligning a tubular member relative to a drill head, comprising:
    positioning the tubular member on an object support member of a support assembly;
    raising, by an actuator, the object support member from a first position to a second position relative to a base connected to the object support member, the second position being configured to be proximate to the drill head;
    aligning an end of the tubular member with the drill head;
    allowing, by at least one spring connected between the object support member and the base, the tubular member to self-align an axis of rotation of the tubular member relative to an axis of rotation of the drill head; and
    threadably engaging the end of the tubular member with the drill head, wherein the step of allowing the tubular member to self-align enables self-aligning movement of the tubular member relative to the drill head to maintains threads on the tubular member and on the drill head in a proper alignment to avoid binding of the tubular member and the drill head.

11. The method of claim 10, wherein the step of allowing the tubular member to self-align further comprises:
    adjusting distance and/or pressure as needed between the end of the tubular member and the drill head with first, second and third springs defining the at least one spring.

* * * * *